US008599443B2

(12) United States Patent
Yamada

(10) Patent No.: US 8,599,443 B2
(45) Date of Patent: Dec. 3, 2013

(54) IMAGE FORMING APPARATUS WITH N-IN-ONE PRINTING

(75) Inventor: Akihiro Yamada, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1531 days.

(21) Appl. No.: 11/442,256

(22) Filed: May 30, 2006

(65) Prior Publication Data

US 2006/0268303 A1 Nov. 30, 2006

(30) Foreign Application Priority Data

May 30, 2005 (JP) ................................. 2005-156836

(51) Int. Cl.
*H04N 1/387* (2006.01)
*B41J 2/15* (2006.01)
*G06K 9/32* (2006.01)
*G03G 15/00* (2006.01)

(52) U.S. Cl.
USPC .......... 358/450; 358/1.9; 358/1.12; 358/1.13; 347/37; 382/298; 399/364

(58) Field of Classification Search
USPC .............. 358/450, 1.12, 1.13, 1.14, 1.18, 1.9, 358/1.2, 1.15, 3.2; 382/298; 347/37, 55, 347/153, 212
See application file for complete search history.

(56) References Cited

U.S. PATENT DOCUMENTS

| 5,124,799 | A | | 6/1992 | Tsuboi et al. |
| 5,867,279 | A | * | 2/1999 | Funamizu et al. ............ 358/296 |
| 6,285,460 | B1 | * | 9/2001 | Koh et al. .................... 358/1.18 |
| 6,411,400 | B1 | * | 6/2002 | Mori .............................. 358/1.2 |
| 6,512,899 | B2 | | 1/2003 | Shimada et al. |

(Continued)

FOREIGN PATENT DOCUMENTS

| JP | H3 72776 | 3/1991 |
| JP | H8 116431 | 5/1996 |

(Continued)

OTHER PUBLICATIONS

Japan Office Action, Notification of Reason for Refusal for Japanese Patent Application No. 2005-156836, mailed May 18, 2010.

*Primary Examiner* — Steven Kau
(74) *Attorney, Agent, or Firm* — Baker Botts L.L.P.

(57) ABSTRACT

An image forming apparatus capable of forming multiple copies of images on a medium having more than one divided area (N) by arranging the images in the divided areas, respectively. The image forming apparatus includes an input image data acquisition unit that acquires an input image data for one copy, an output image data generation unit that generates output image data in which the images are consecutively arranged on the divided areas without a blank divided area being provided between any of the copies by repeatedly using the input image data for one copy acquired by the input image data acquisition unit a number of times equal to the number of divided areas, and an image forming unit that forms an image on the recording medium based on the output image data.

6 Claims, 10 Drawing Sheets

(56) References Cited

U.S. PATENT DOCUMENTS

| | | | |
|---|---|---|---|
| 6,765,687 B2 * | 7/2004 | Tanaka et al. | 358/1.18 |
| 6,791,703 B1 * | 9/2004 | Maeda et al. | 358/1.15 |
| 7,253,911 B2 * | 8/2007 | Aritomi | 358/1.13 |
| 7,266,315 B2 * | 9/2007 | Sato | 399/38 |
| 7,505,169 B2 * | 3/2009 | Matsuda et al. | 358/1.18 |
| 7,808,663 B2 * | 10/2010 | Teranishi et al. | 358/1.15 |
| 2002/0054310 A1 * | 5/2002 | Nakagiri et al. | 358/1.12 |
| 2002/0085226 A1 * | 7/2002 | Aritomi | 358/1.13 |
| 2004/0046985 A1 * | 3/2004 | Watanabe et al. | 358/1.13 |
| 2005/0099660 A1 * | 5/2005 | Yada et al. | 358/498 |

FOREIGN PATENT DOCUMENTS

| | | | |
|---|---|---|---|
| JP | H9 123562 | | 5/1997 |
| JP | 2001 246802 | | 9/2001 |
| JP | 2001-287419 | * | 10/2001 |
| JP | 2001-287419 A | | 10/2001 |
| JP | 2004-023342 | * | 1/2004 |
| JP | 2004-023342 A | | 1/2004 |
| JP | 2004-155165 | * | 6/2004 |
| JP | 2004-155165 A | | 6/2004 |
| JP | 2005-043773 | * | 2/2005 |
| JP | 2005-043773 A | | 2/2005 |

* cited by examiner

IMAGE FORMING APPARATUS WITH N-IN-ONE PRINTING

CROSS REFERENCE TO RELATED APPLICATION

This application claims priority from Japanese Patent Application No. 2005-156836, filed May 30, 2005, the contents of which are hereby incorporated by reference into the present application.

TECHNICAL FIELD

Aspects of the present invention relate to an image forming apparatus for forming plural copies of an image from input image data, using a so-called N-in-one function.

BACKGROUND

JP-A-9-123562 discloses an image forming apparatus having a so-called N-up or N-in-one function for printing by arranging input images on divided areas respectively on a sheet that is divided into N (>1).

In the conventional image forming apparatus, when plural copies of the image are printed, using the N-in-one function, the following problem may occur. When five copies of the images are printed in 4 in 1, based on input image data including three total pages in total. The conventional image forming apparatus generates output image data in such a way that, after the images from first page to third page for the first copy are arranged in divided areas on the first sheet, a form or page break is used, regardless of whether or not a blank divided area arises on the first sheet. Then, the images from first page to third page for the second copy are arranged in the divided areas on the next sheet. Accordingly, the images A, B and C from first page to third page are arranged and printed, whereby a total of five sheets with one blank divided area are printed, as shown in FIG. 10. This phenomenon is problematic when the printed sheet is cut into four for use (e.g., a slip or check table printed in 4-in-one) because a waste sheet is contained in the sheets after cutting.

There is a method for avoiding this problem in the case where the image forming apparatus receives an input image data from a terminal unit. That is the input image data in which five copies of the three pages of images are arranged consecutively by copying and pasting the data of three pages repeatedly four times in an application software produced at the terminal unit. Then, the image data is transmitted to the image forming apparatus. However, this operation is troublesome. On the other hand, in the case where the input image data is acquired by reading a document through a scanner, the above method cannot be employed, and five sheets are consumed.

Also, in the case where the input image data is acquired by reading the document on the scanner, when a plurality of same document images are printed in 4 in 1 in the conventional image forming apparatus, it is required to read the same document on the scanner, whereby the workability was low.

Aspects of this invention provide an image forming apparatus that can solve the problem with a so-called N-in-one function.

SUMMARY

According to an aspect of the present invention, an image forming apparatus that forms plural copies of images on a recording medium having divided areas N (>1) by arranging the images on the divided areas, respectively, includes: an input image data acquisition unit that acquires an input image data for one copy; an output image data generation unit that performs a first generation process to generate an output image data in which the images are consecutively arranged on the divided areas, respectively, without a blank divided area for the plurality of copies by employing the input image data for one copy acquired by the input image data acquisition unit repeatedly by a number of times corresponding to the plurality of copies; and an image forming unit that forms an image on the recording medium based on the output image data generated by the first generation process.

The "image forming apparatus" may be not only a printing apparatus such as a printer (e.g., a laser printer) but also a facsimile apparatus or a composite machine having the printer function and the scanner function.

The "recording medium" is not limited to the paper medium such as sheet, but may be a plastic printing medium such as an OHP sheet.

The "input image data" may be the original image data read by document reading unit or the image data received from the terminal unit that can make the data communication through the communication line.

According to another aspect of the present invention, an image forming apparatus that forms images on a recording medium having divided areas N (>1) by arranging the images on the divided areas, respectively, includes: an input image data acquisition unit that acquires an input image data; a reduction ratio information acquisition unit that acquires reduction ratio information of the image on the recording medium; a division number decision unit that determines a division number N based on a reduction ratio acquired by the reduction ratio information acquisition unit; an output image data generation unit that generates the output image data in which the plurality of images for page by page are consecutively arranged on the divided areas, respectively, without a blank divided area based on the input image data acquired by the input image data acquisition unit; and an image forming unit that forms an image on the recording medium based on the output image data generated by the output image data generation unit.

According to yet another aspect of the present invention, an image forming apparatus that forms images on a recording medium having divided areas N (>1) by arranging a plurality of document images on the divided areas, respectively, includes: a document reading unit that reads the document image; a specification unit that specifies a same image forming number to form the same document image on one recording medium; an output image data generation unit that generates an output image data in which the same document is arranged by the same image forming number specified by the specification unit on a recording medium, employs a document image data read by the document reading unit repeatedly by a number of times corresponding to the plurality of document images; and an image forming unit that forms an image on the recording medium based on the output image data generated by the output image data generation unit.

DETAILED DESCRIPTION OF THE INVENTION

Referring to FIGS. 1 to 10, one aspect of the present invention will be described below.

1. Configuration of this Aspect

Figure 1:
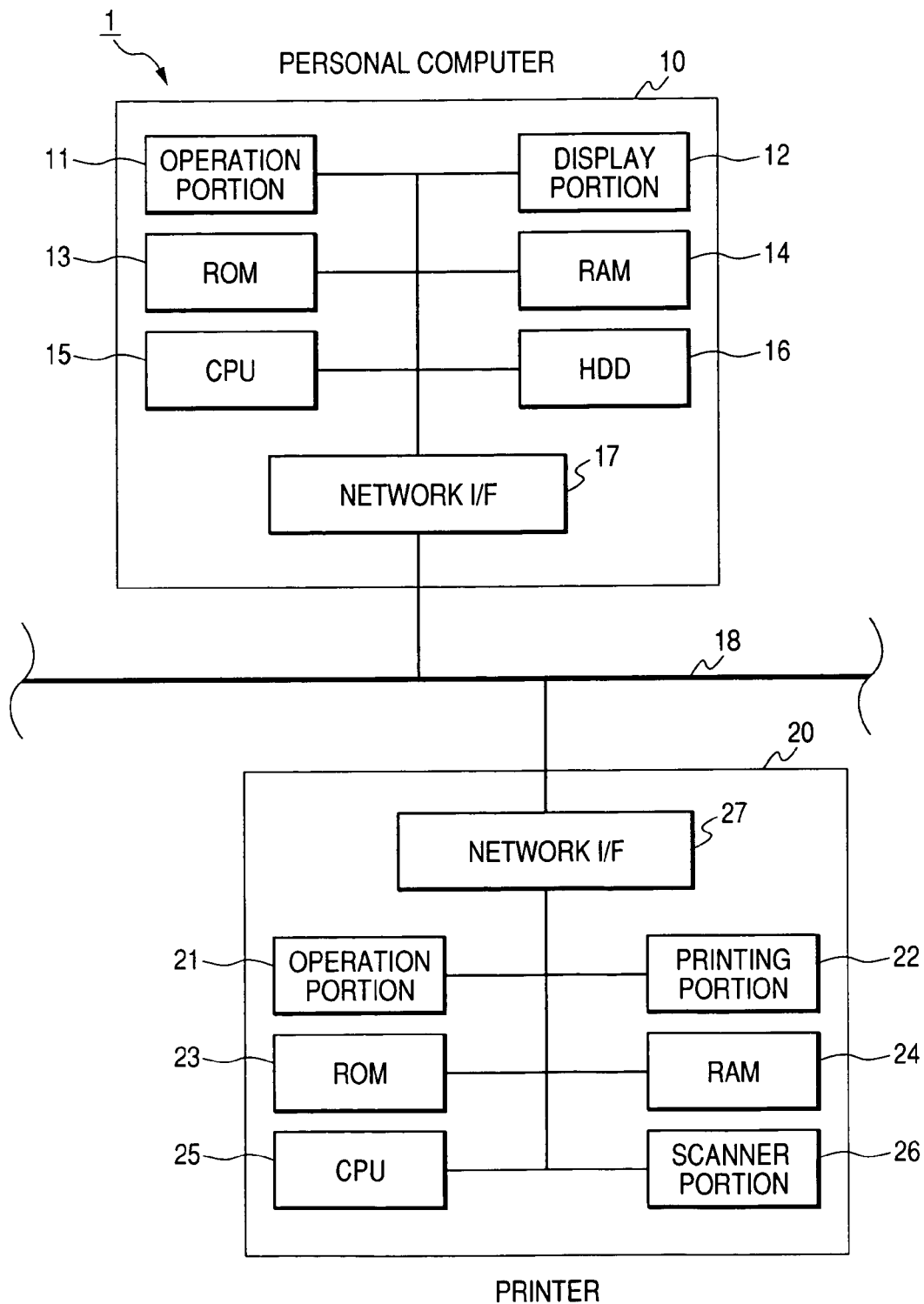
FIG. 1 is a block diagram showing a printing system 1 according to an aspect of the present invention.
Figure 2:
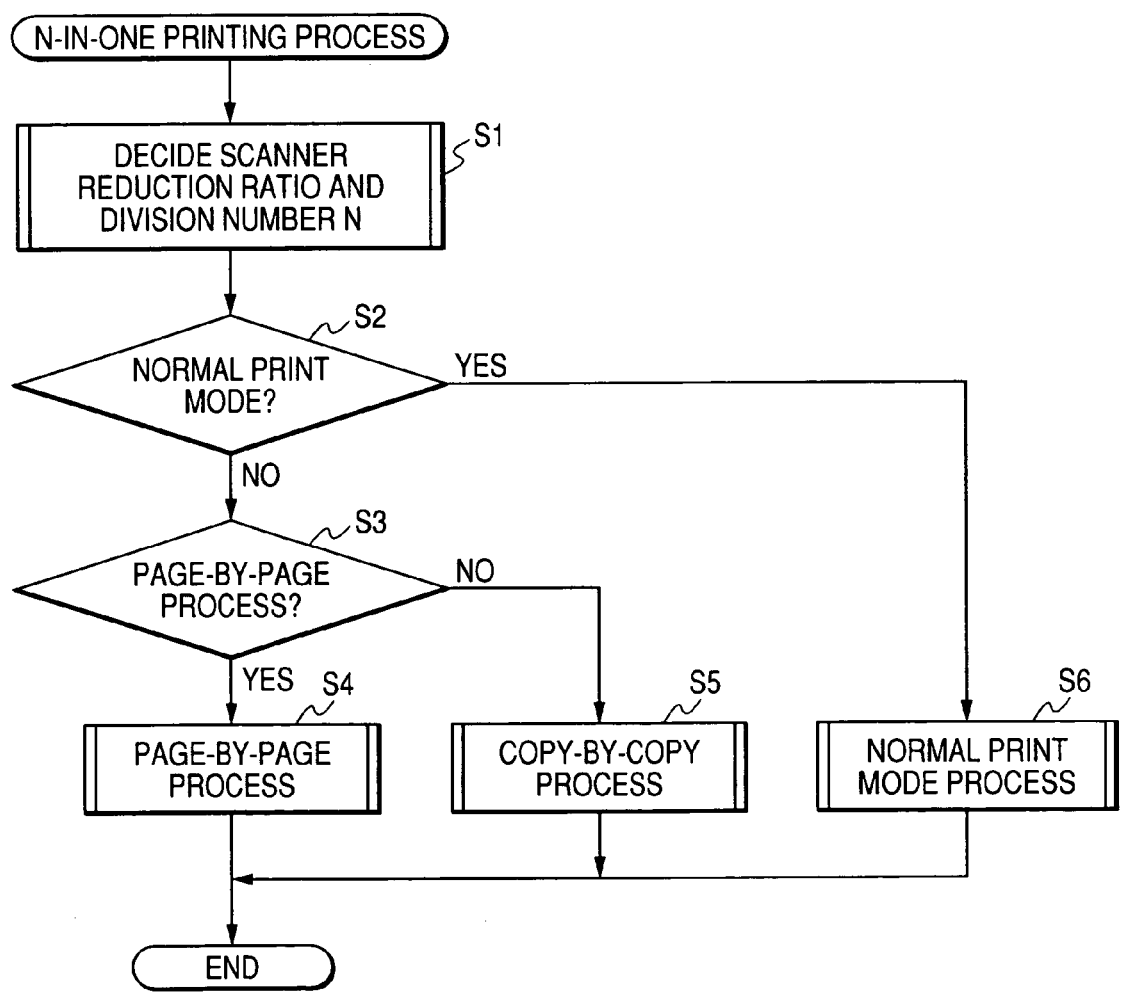
FIG. 2 is a flowchart showing an N-in-one printing process.

FIG. 1 is a block diagram showing a printing system 1 according to this aspect. The printing system 1 has a personal computer 10 as a terminal unit and a laser printer (hereinafter referred to as a "printer 20") which are connected via network interfaces 17, 27 to the Internet 18, to communicate with each other. The printer 20 receives and prints the input image data transmitted from the personal computer 10. Also, the printer 20 includes a scanner portion 26 and prints the input image data of a document image read by the scanner portion 26, as will be described later.

(1) Personal Computer

The personal computer 10 includes an operation portion 11 (such as a keyboard or a mouse) that accepts an input operation from outside, a display portion 12 for displaying an image, a ROM 13, a RAM 14, a CPU 15, a hard disk 16, and a network interface 17. The hard disk 16 stores an application software for creating information to be printed, and a printer driver. The CPU 15 activates the application software and printer driver, which are read from the hard disk 16, based on a start command from the operation portion 11.

Upon receiving a print request command from the operation portion 11 by an input operation of the user, the input image data created by the application software is transferred to the printer driver. The input image data is expanded (converted) into PDL data, and transmitted via the network interface 17.

(2) Printer

The software of the printer 20 is shown in FIG. 1 in a simplified manner. The printer 20 includes an operation portion 21 for receiving input operations, a printing portion 22 for controlling printing on the sheet, a ROM 23, a RAM 24, a CPU 25, a scanner portion 26, and a network interface 27. The operation portion 21 is capable of assigning the following items:

a) N-in-one printing, b) Division number "N" in the N-in-one printing, c) Reduction ratio in the N-in-one printing, d) Number of copies in the N-in-one printing (hereinafter a assigned copy number K), e) Determining normal print mode or consecutive arrangement print mode in the N-in-one printing, f) Selecting from the page-by-page printing or the copy-by-copy printing in the consecutive arrangement print mode, g) How many times the document is arranged on one sheet (hereinafter same document arrangement number H) in the normal print mode, and h) Starting reading the document and ending reading the document in the scanner portion 26.

2. N-in-One Printing

Referring to FIGS. 2 to 9, the control of the CPU 25 in the N-in-one printing to print by arranging the image (document image) at each page in each area on the sheet divided into N (>1) areas will be described below.

First of all, reading the document image by the scanner portion 26, and N-in-one printing based on the input image data of the document image will be described. When the N-in-one printing is assigned in the operation portion 21 of the printer 20, the CPU 25 performs the control shown in FIG. 2.

A scan reduction ratio/division number N is determined at S1. Specifically, when the division number N is specified in the operation portion 21, the reduction ratio capable of arranging the sheet divided into N areas is automatically determined. On the other hand, when the reduction ratio is specified in the operation portion 21, the division number N is the maximum number of images scaled down at the specified reduction ratio capable of being arranged within one sheet; or the division numbers N specified beforehand (e.g., 2, 4, . . . ) are prepared, and the division number N is determined to correspond to a reduction ratio closest to the specified reduction ratio.

Next, the normal print mode is judged at S2. If the consecutive arrangement print mode is selected in the operation portion 21 ("N" at S2), the procedure goes to S3, where whether or not the page-by-page process is performed is judged. If the page-by-page process is selected in the operation portion 21 ("Y" at S3), the CPU 25 performs the page-by-page process at S4 as shown in FIG. 3.

(1) Page-by-Page Process

Herein, an example of reading the document images of three pages of A image, B image and C image by the scanner portion 26 and performing the 4-in-one printing of three document images for five copies (specified copy number K=5) will be described below.

Figure 3:
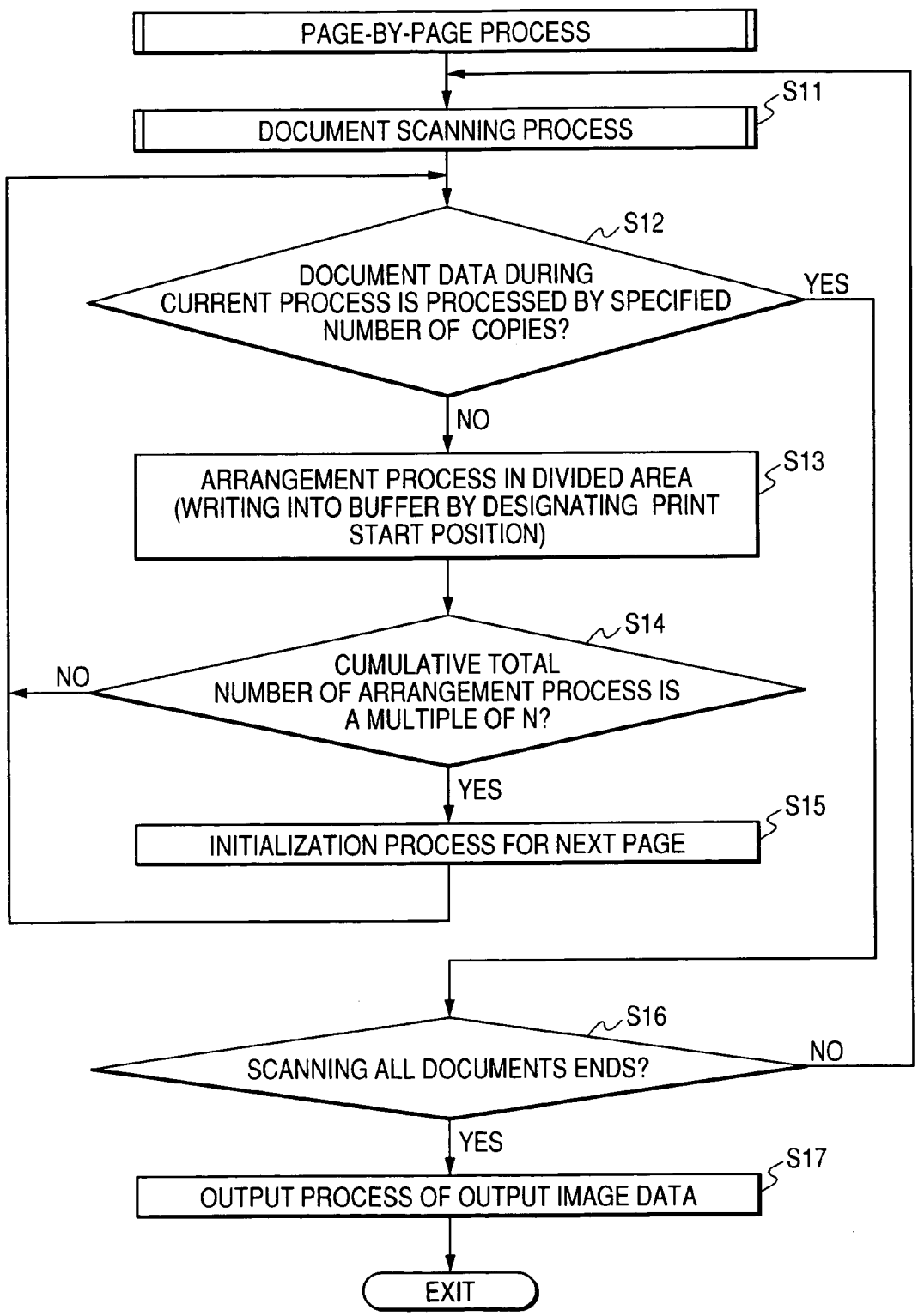
FIG. 3 is a flowchart showing a page-by-page process.
Figure 4:
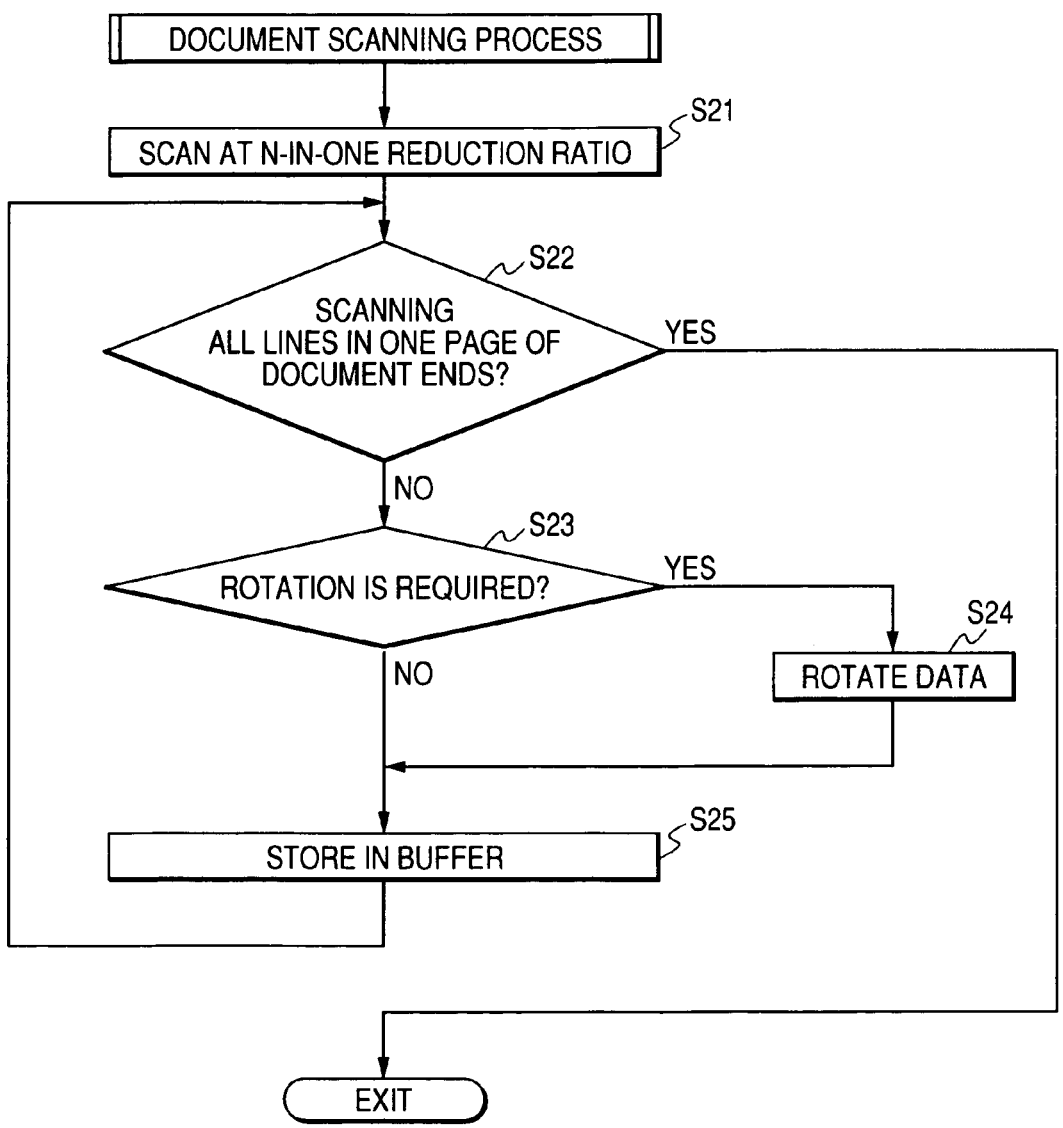
FIG. 4 is a flowchart showing a document scanner process.

If the document of A image is disposed in the reading part of the scanner portion 26, and a reading start operation is performed only once in the operation portion 21, the CPU 25 scans a document at S11 as shown in FIG. 3. On scanning the document, the reading of the document of A image starts at the scan reduction ratio determined in the scan reduction ratio/division number N decision process at S21, and the following process is consecutively performed by every predetermined number of lines for the document of A image, as shown in FIG. 4.

At S3, whether or not the rotation of image is needed is judged. For example, when the 2 in 1 printing is specified where the document of A image is vertically oriented, rotation is needed. Data is rotated by 90 degrees at S24, and temporarily stored in a first buffer area kept in the RAM (S25). On the contrary, when the 4-in-one printing is specified as in this invention, rotation is unnecessary, and the data is directly stored in the first buffer area without rotation (S25) This process is performed for all lines in the document of A image ("Y" at S22), and the procedure goes to S12 of FIG. 3.

At S12, it is judged whether or not the document data, namely, the input image data for the document of A image, is processed for the specified number of copies, viz., five copies. If not processed ("N" at S12), the input image data stored in the first buffer area is read at S13, and written in a second buffer area kept in the RAM by specifying the arranging positions (print start positions) for arranging the document image of A image in four divided areas on one sheet in a predetermined order. Then, it is judged whether or not a cumulative total number of the arrangement process (S13) is a multiple of the division number 4 at S14. If the cumulative total number is the multiple of the division number 4 ("Y" at S14), each divided area on the sheet is fully embedded, in which the printing start position is initialized to the initial printing position at which the image is firstly arranged on the next sheet at S15.

The document of A image in each divided area is consecutively arranged for the specified number of copies, viz., five copies, by repeatedly employing the input image data for the document of A image stored in the first buffer area. The A image is embedded in the four divided areas on the first sheet, and the next page initialization process (S15) is performed, so that one A image is arranged in the divided area on the left side at the upper stage on the second sheet, as shown in FIG. 5.

Then, it is judged whether or not all the documents are scanned at S16. In the operation portion 21, when one document is read, a message to inquire a next document is displayed on the display part of the operation portion 21. The next document of B, C image is arranged in the reading part of the scanner portion 26, and each image is read once. If there is no next document, reading the document ends. Thereby, the CPU 25 can judge whether or not all the documents are scanned.

Figure 5:
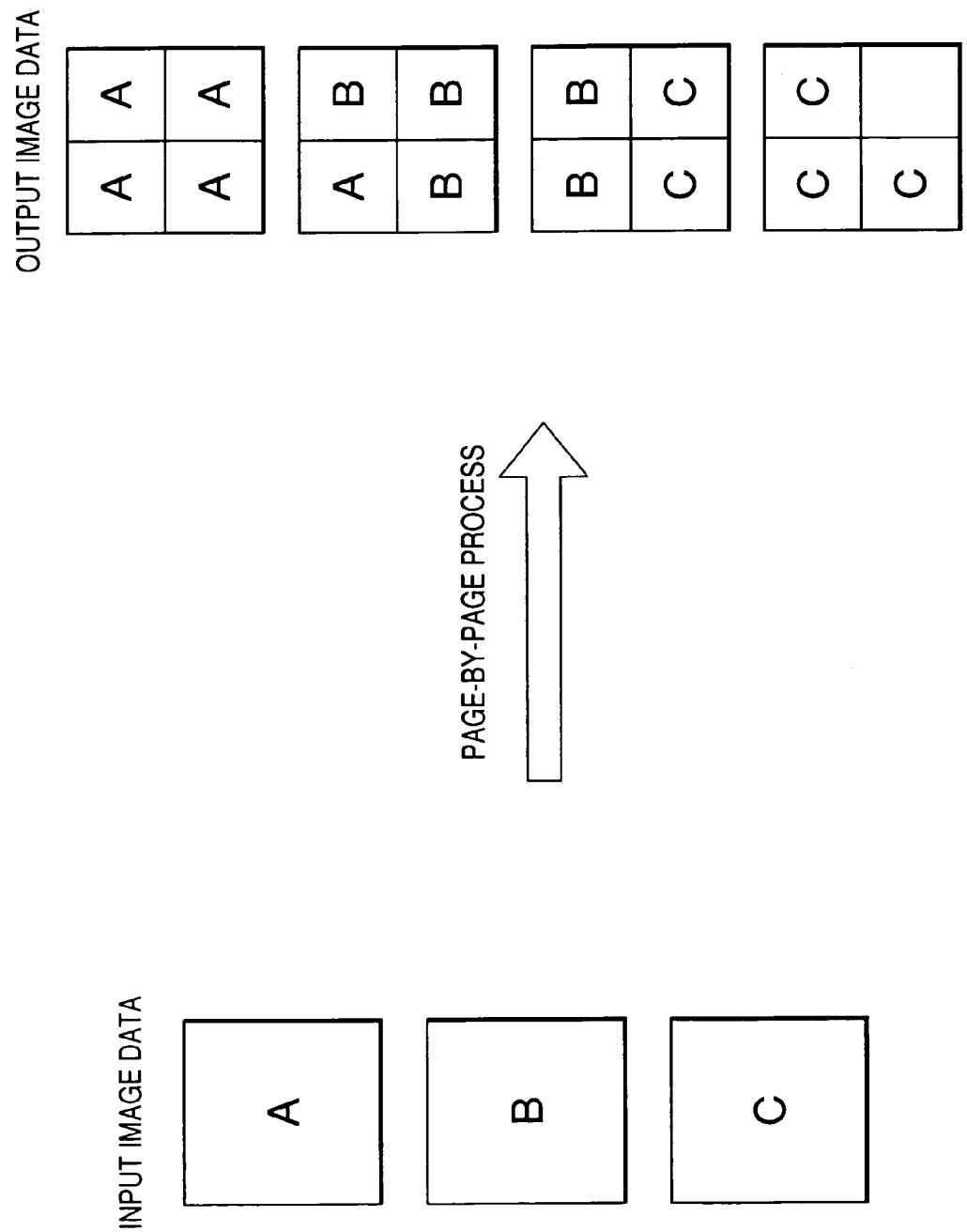
FIG. 5 is a schematical view showing printed results in the page-by-page process.

Since the documents of B, C images are provided in addition to the document of A image, the processing from S11 to S15 is performed for the document of B image, whereby three B images are arranged in the remaining three divided areas on the second sheet, and two B images are arranged in the two divided areas at the upper stage on the third sheet, as shown in FIG. 5. Further, the processing from S11 to S15 is performed for the document of C image, whereby two C images are arranged in the two divided areas at the lower stage on the third sheet, and three C images are consecutively arranged in the three divided areas on the fourth sheet, as shown in FIG. 5.

When all the documents are scanned ("Y" at S16), the output image data written in the second buffer area is read and outputted to the printing portion 22 at S17. The printing portion 22 prints once this output image data, four sheets on which five A images followed by five B images, which are followed by five C images, are consecutively arranged without a blank divided area are outputted, as shown in FIG. 5.

(2) Copy-by-Copy Process

Figure 6:
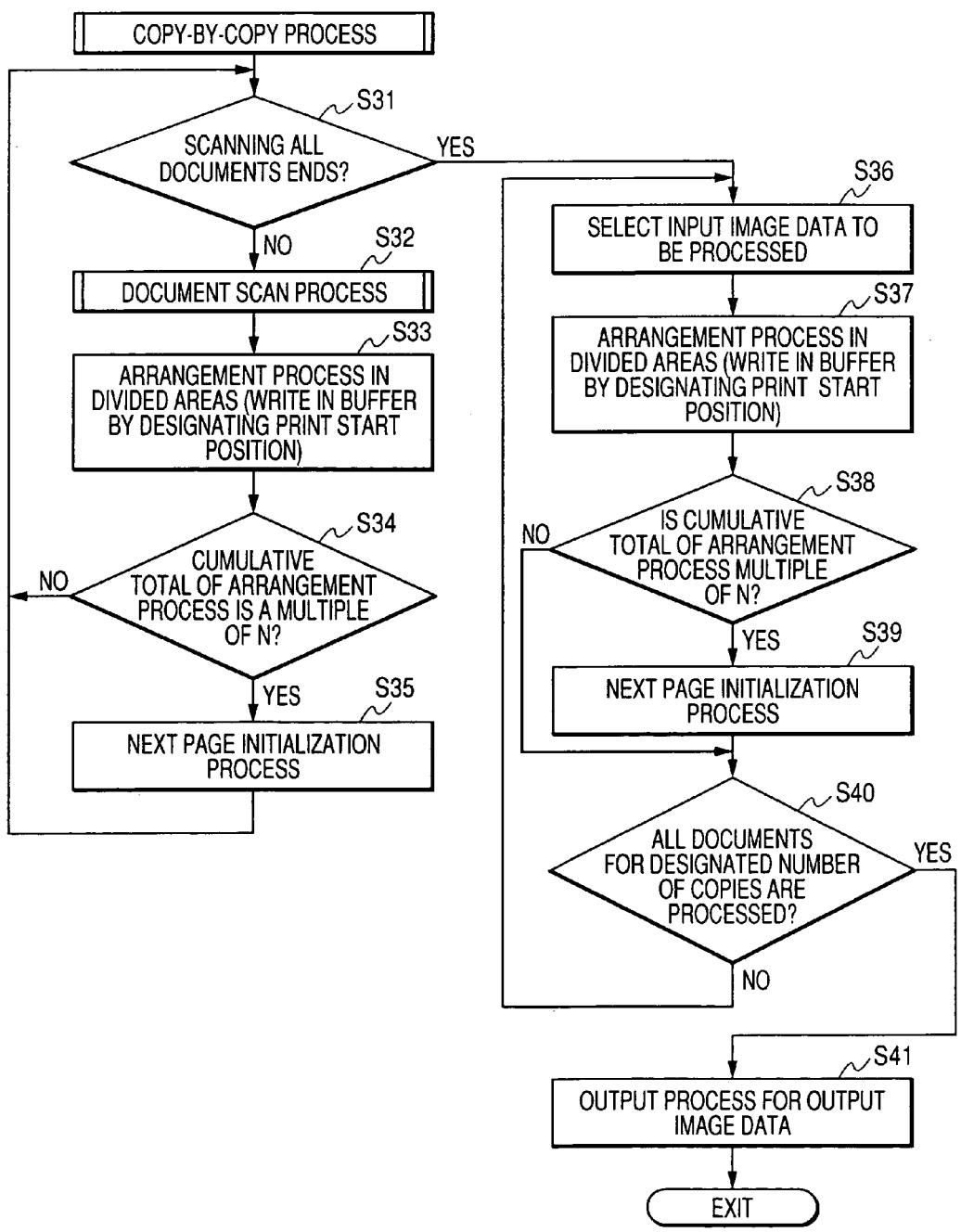
FIG. 6 is a flowchart showing a copy-by-copy process.

When a copy-by-copy process is selected in the operation portion 21 ("N" at S3), the CPU 25 performs the copy-by-copy process as shown in FIG. 6 at S5. Herein, an example of reading the document images of three pages of A image, B image and C image by the scanner portion 26 and performing the 4-in-one printing of three document images for five copies in the same manner as explained in the page-by-page process will be described below.

If the document of A image is disposed in the reading part of the scanner portion 26, and the reading start operation is once performed in the operation portion 21, the CPU 25 judges whether or not scanning all the documents ends at S31 of FIG. 6. Since the process has started, it is judged that all the documents are not scanned ("N" at S31). The document scanner process, like S11 of FIG. 3, is performed at S32, and at S33, the input image data of A image stored in the first buffer area is read at S33, and written in the second buffer area by specifying the arranging positions (print start positions) for arranging the document image of A image in four divided areas on one sheet in a predetermined order. Then, it is judged at S34 whether or not a cumulative total number of making the arrangement process (S33) is a multiple of the division number. If the cumulative total number is the multiple of the division number 4 ("Y" at S34), each divided area on the sheet is fully embedded, in which the printing start position is initialized to the initial printing position at which the image is firstly arranged on the next sheet at S35.

Figure 7:
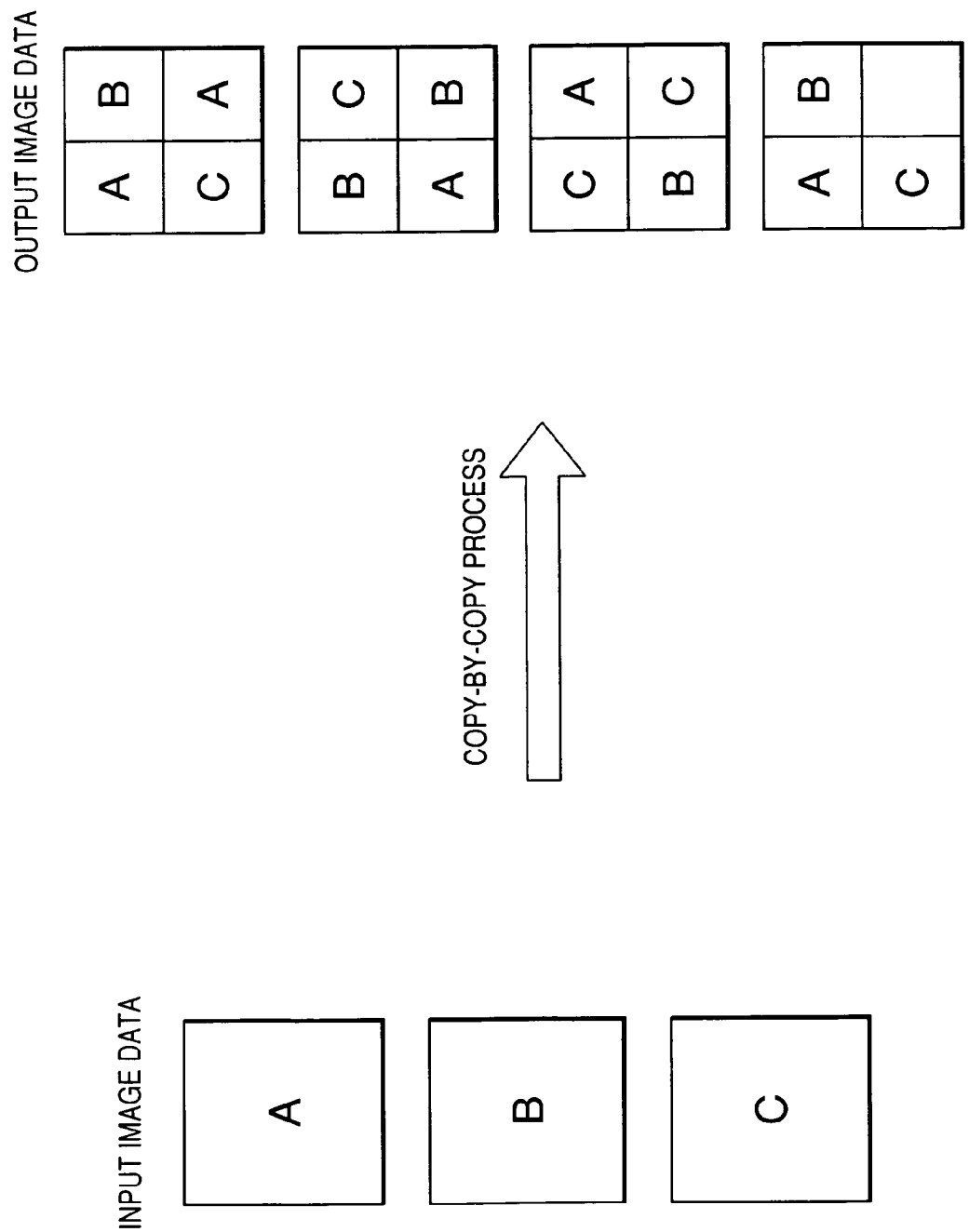
FIG. 7 is a schematical view showing printed results in the copy-by-copy process.

Reading the documents of B image and C image starts in the operation portion 21, and the processing from S32 to S35 is performed for the documents of B image and C image. When reading the document ends in the operation portion 21 ("Y" at S31), one A image, one B image and one C image for the first copy are arranged in order in three divided areas on the first sheet, as shown in FIG. 7.

The arrangement process is performed by repeatedly employing each input image data stored in the first buffer area without reading the document in the scanner portion 21. That is, the next input image data is selected from the input image data of A image, B image and C image stored in the first buffer area at S36. Here, the input image data is selected repeatedly four times (specified copy number K-1) in the order of A image, B image and C image.

The input image data is specified in the order of A image, B image and C image, and the same processing as S33 to S35 is performed consecutively for each input image data (S37 to S39). Subsequent to the A image, B image and C image for the first copy, the A image for the second copy is arranged in the divided area on the right side at the lower stage of the first sheet, and the B image and C image are arranged in two divided areas at the upper stage of the second sheet. In the following, the same processing is repeatedly performed for third, fourth and fifth copies ("Y" at S40), and the output image data written in the second buffer area at S41 is read and outputted to the printing portion 22. The printing portion 22 performs one printing operation for this output image data, and four sheets are outputted in which the images for five copies are arranged consecutively in the divided areas in the order of A image, B image and C image without a blank divided area, as shown in FIG. 7.

(3) Normal Printing Process

Figure 8:
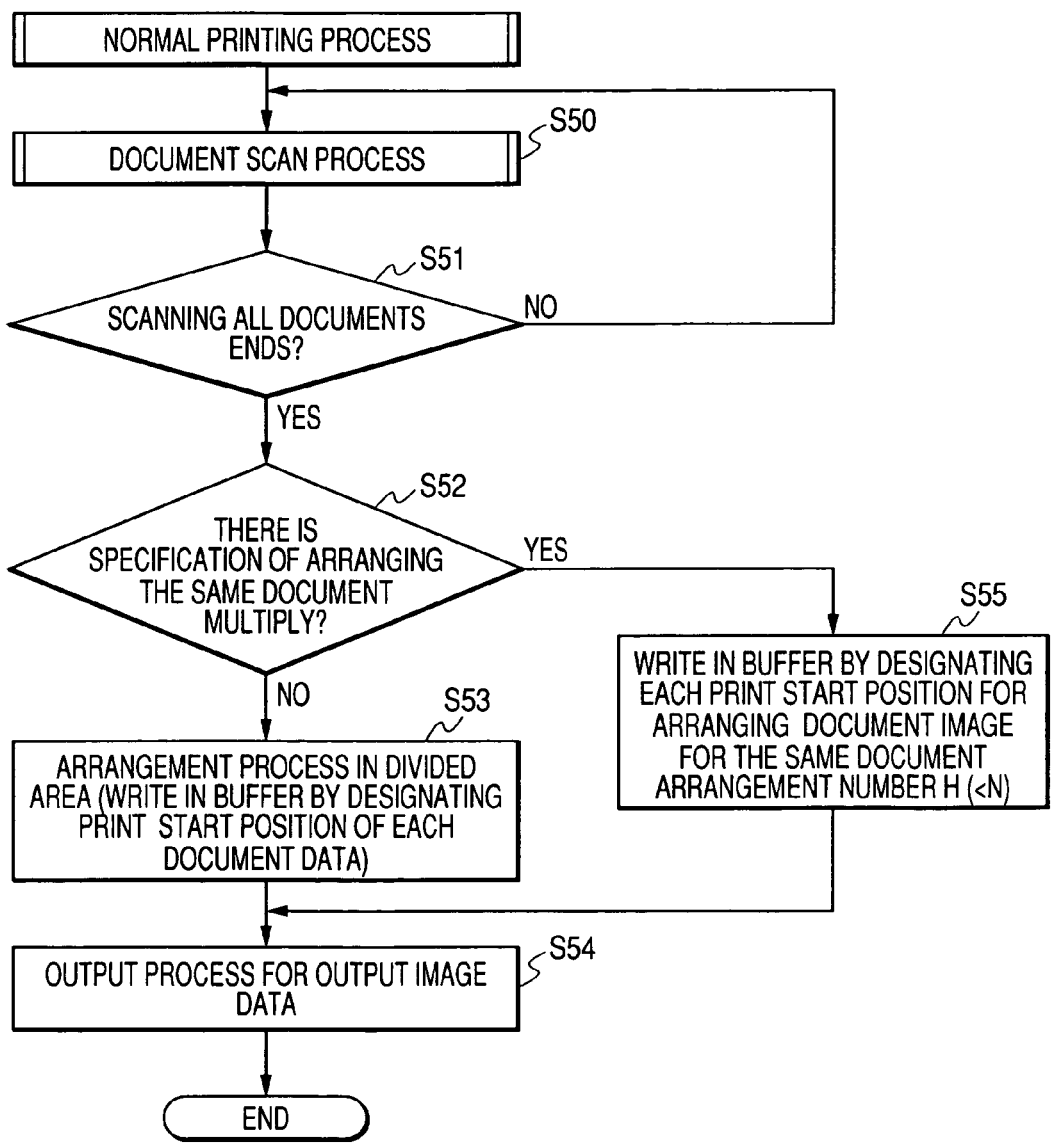
FIG. 8 is a flowchart showing a normal printing process.

If a normal printing process is selected in the operation portion 21 ("Y" at S2 of FIG. 2), the CPU 25 performs the normal printing process as shown in FIG. 8 at S6. Herein, an instance of reading the document images of three pages of A image, B image and C image by the scanner portion 26, and performing the 4-in-one printing of three document images for five copies in the same manner without specification of the same document arrangement number H will be described below, as explained in the page-by-page process.

At S50, the document scan process like S11 of FIG. 3 is performed for all the document images of A image, B image and C image. When the document is scanned ("Y" at S51), it is judged whether the same document plural arrangement specification is specified in the operation portion 21 at S52. If the same document plural arrangement specification is not specified ("N" at S52), the input image data of A image, B image and C image stored in the first buffer area are read, and written in the second buffer area by specifying the arranging positions (print start position) of arranging the A image, B image and C image for one copy in the divided areas on the sheet in a predetermined order at S53.

Figure 10:
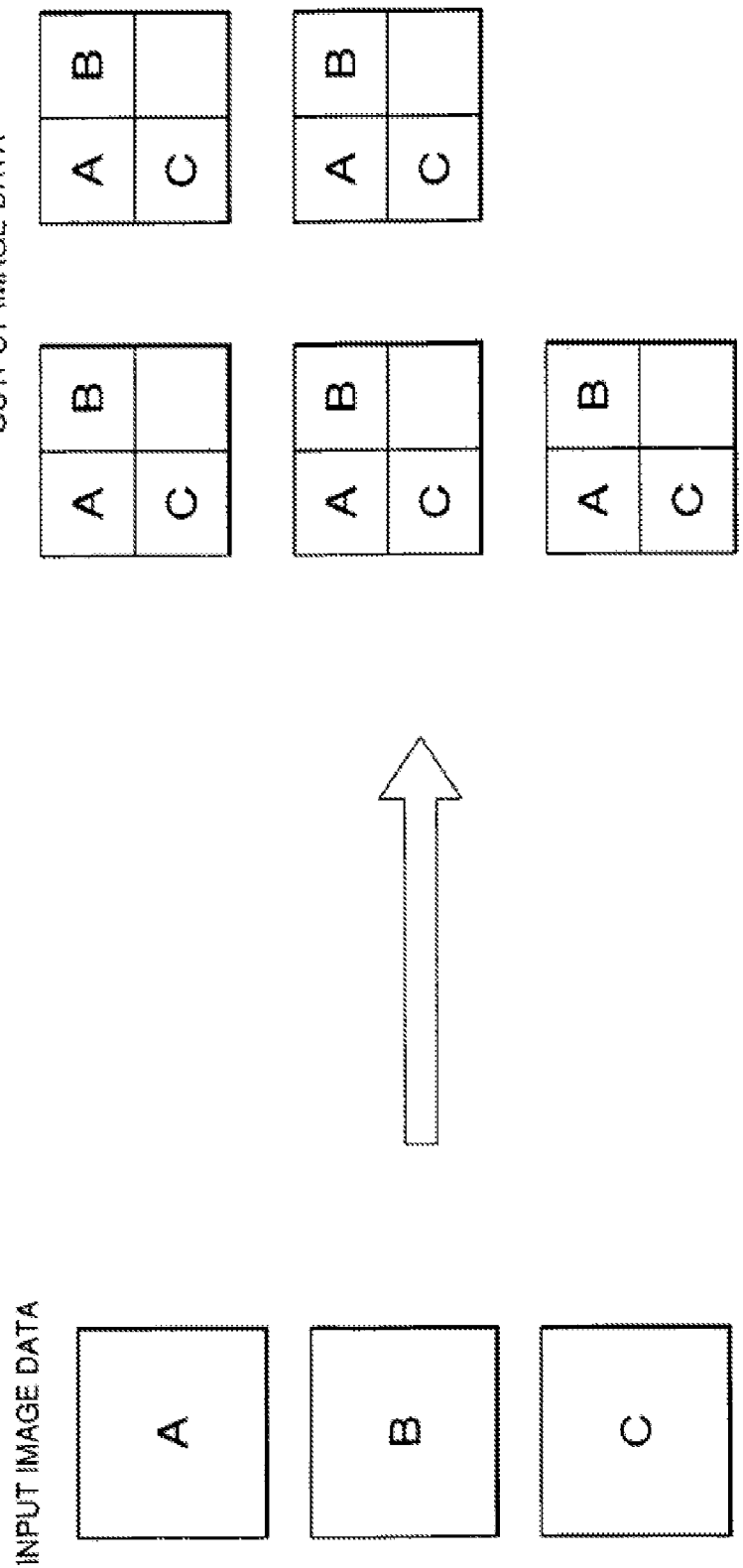
FIG. 10 is a schematical view showing the printed results in the normal printing process (without assigning arrangement of a plurality of same documents).

The output image data for one copy written in the second buffer area is read and outputted to the printing portion 22 at S54. In this output image data for one copy, the A image, B image and C image are arranged in the three divided areas on one sheet, and one blank divided area is left, as shown in FIG. 10. The printing portion 22 outputs five sheets in which the A image, B image and C image are arranged and printed and one blank divided area is formed by performing the printing operation of the output image data for one copy repeatedly by the specified copy number, viz., five copies, as shown in FIG. 10. In the consecutive arrangement print mode, the sheet on which the images are arranged consecutively without a blank divided area is outputted, whereas in the normal print mode, the sheet is outputted by feeding the form for each copy, regardless of a blank divided area.

Figure 9:
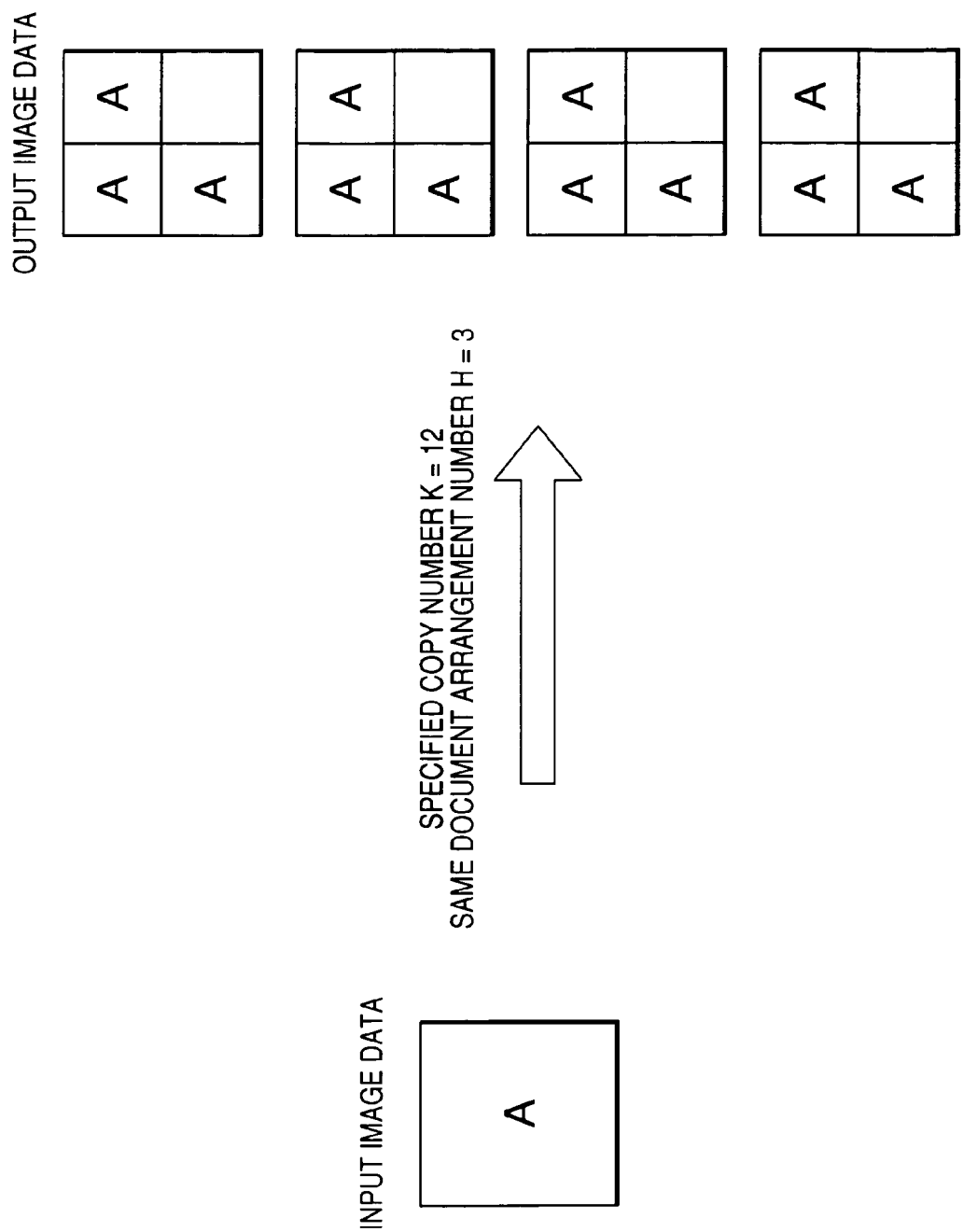
FIG. 9 is a schematical view showing printed results in the normal printing process.

When the A image is arranged for a specified copy number of 12 copies with three images on each sheet, for example, it is required that the document of A image is read three times by the scanner portion to make the specified copy number 4 in the conventional printer. However, in this aspect, the same document plural arrangement specification is made in the operation portion 21 without reading the same document of A image three times. When the same document plural arrangement specification is made ("Y" at S52), each print start position for arranging the same A image corresponding to the same document plural arrangement number of three in three divided areas on one sheet is specified and written in the second buffer area at S55. The output image data in which three A images written in the second buffer area are arranged is read and outputted to the printing portion 22 at S54. In the printing portion 22, this output image data is repeatedly printed by the number of times obtained from the specified copy number K divided by the same document plural arrangement number H (four times, here). As a result, four sheets on each of which three A images are arranged and printed are outputted, as shown in FIG. 9.

In the case where the N-in-one printing is performed based on input image data sent from the personal computer 10, a data receiving process is performed, instead of the document scan process at S11 of FIG. 3, S32 of FIG. 6 and S50 of FIG. 8. In the printer 20, when the input image data is received from the personal computer 10, the input image data is received via the network interface 27, and temporarily stored in the reception buffer area kept in the RAM 24. The CPU 25 consecutively processes the input image data stored in the reception buffer area for every predetermined amount of data. Also, the above specification items a) to g) are specified by the personal computer 10, and its specification information is transmitted together with the input image data to the printer 20.

3. Effect of this Aspect (1) With this aspect, if the consecutive arrangement print mode is selected, the sheets, in which the image at every page is arranged and printed consecutively in the divided areas on the sheet without a blank divided area for plural copies, can be outputted and printed. Accordingly, the N-in-one printing can be performed by making effective use of the sheet without causing wasteful blank divided area.

(2) In the case where the image is employed as the slit image by cutting after performing the N-in-one printing, the consecutive arrangement print mode is selected without a blank field on the sheet after cutting, while in the case where the N-in-one printing is performed for the document image includes plural pages, the normal print mode is selected for printing on the sheet by feeding the form for each copy.

(3) In the consecutive arrangement print mode, the N-in-one printing is performed in various patterns by selecting between the page-by-page printing and the copy-by-copy printing.

(4) In the normal print mode, if the same document plural arrangement specification is made, the N-in-one printing is implemented by arranging a plurality of same images on one sheet by one reading operation without making the reading operation multiply for the same document.

(5) Further, if the reduction ratio of the image is specified beforehand, the N-in-one printing is performed by automatically specifying the division number N suitable for the reduction ratio, whereby the convenience is very high.

<Other Aspects>

The present invention is not limited to the aspects as described above with reference to the drawings, but the following aspect may be included within a technical scope of the invention, and various changes may be made without departing from the scope or spirit of the invention.

(1) Though in the above aspects, the images are arranged from the upper stage to the lower stage of the divided areas on one sheet, the images may be arranged from the left side to the right side of the divided areas.

(2) Though in the above aspects, the arrangement process (S13) is performed in parallel every time each document image is read in the page-by-page process, the arrangement process may be performed after all the documents are first read.

What is claimed is:

1. An image forming apparatus, comprising:
   an image forming unit configured to form an image on a recording medium;
   a processor; and
   a memory storing instructions, when executed by the processor, cause the image forming apparatus to:
   set a first particular number N which is an integer greater than 1, wherein the first particular number N indicates a number of divided areas of a recording medium, and wherein the image forming unit is configured to form N pages of images on a single recording medium; and
   set a second particular number K which is an integer greater than 1, wherein the second particular number K indicates a number of copies of the images to be formed by the image forming unit;
   wherein the image forming apparatus is configured to execute one of a first process, a second process, and a third process,
   wherein the image forming apparatus executes a first process in response to selection of a page-by-page printing operation, the first process comprising:
   (A1) acquire input image data for one page of an M-page image, wherein M is integer greater than 1;
   (B1) designate one of the divided areas on which the input image data for one page is formed;
   (C1) place the input image data for one page in the designated one of the divided areas;
   (D1) determine whether all N areas of the divided areas are filled with the placed input image data;
   (E1) when determined that all N areas are filled, designate one of the divided areas of another recording medium without any blank divided areas in any recording medium;
   (F1) repeat (B1), (C1), (D1) and (E1) for the one page of M-page image for K times;
   (G1) repeat (A1), (B1), (C1), (D1), (E1) and (F1) until each image of the M-page images is placed in any one of the divided areas without any blank divided areas between the M-page images,
   wherein the image forming apparatus executes a second process in response to selection of a copy-by-copy printing operation, the second process comprising:
   (A2) acquire input image data for an M-page image, wherein M is an integer greater than 1;
   (B2) designate one of the divided areas on which the input image data for one page of the M-page image is formed;
   (C2) place the input image data for first-page image through the Mth-page image of the M-page image in each designated one of the divided areas, respectively;

(D2) repeat (B2) and (C2) for K times without any blank divided areas between copies of the M-page image, wherein the image forming apparatus executes a third process in response to selection of a normal printing operation, the third process comprising:

(A3) acquire input image data for M-page image, wherein M is an integer greater than 1:

(B3) designate one of the divided areas on which the input image data for one page of the M-page image is formed;

(C3) place the input image data for first-page image through the Mth-page image of the M-page image in each designated one of the divided areas respectively;

(D3) determine, when completed to place the input image data for the Mth-page image, whether there is any blank divided area in the recoding medium;

(E3) when determined in (D3) that there is any blank divided area in the recording medium, designate one of the divided areas in another recording medium for the first-page image of a next copy of the M-page image;

(F3) repeat (A3), (B3), (C3), (D3) and (E3) for K times.

2. The image forming apparatus according to claim 1, wherein the page-by-page printing operation comprises arranging a first page of the M-page image for each of the number of copies K to be formed and then arranging a second page of the M-page image for each of the number of copies K to be formed.

3. The image forming apparatus according to claim 2, wherein the image forming apparatus further comprises a selection unit that selects a process to be executed by the image forming apparatus from selecting one of the copy-by-copy printing operation, the page-by-page printing operation, and the normal printing operation.

4. The image forming apparatus according to claim 1, further comprising a document reading unit that reads one or more sheets of a document, wherein the image forming apparatus acquires document image data read by the document reading unit as the input image data.

5. The image forming apparatus according to claim 1, further comprising:

a reduction ratio information acquisition unit that acquires the reduction ratio information of the image on the recording medium; and a division number decision unit that determines a division number N based on the reduction ratio acquired by the reduction ratio information acquisition unit, wherein the image forming apparatus places one page of the one page of the input image data scaled down at the reduction ratio in each area divided into the division number N.

6. The image forming apparatus according to claim 1, wherein the copy-by-copy printing operation comprises, when the number of copies to be formed K is not a multiple of the number of divided areas N, arranging a first copy of the M-page image in the divided areas and then arranging a second copy of the M-page image to consecutively follow the first copy of the M-page image without any blank dividing area being located between the first copy and the second copy.

* * * * *